C. ADAMS-RANDALL.
AUTOMATIC TELEPHONE CIRCUIT AND REPEATER.
APPLICATION FILED MAR. 13, 1911.
1,015,768.
Patented Jan. 30, 1912.
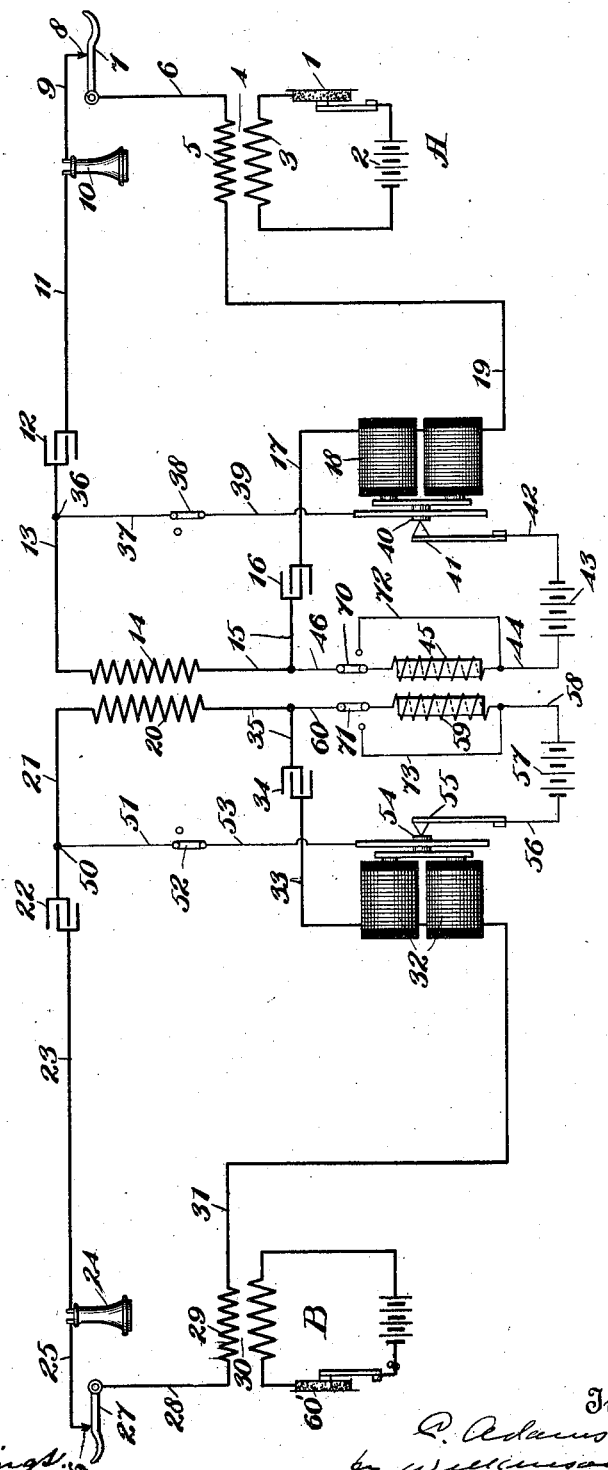
Witnesses
Byron B. Collings
Edwin J. Beller
Inventor
C. Adams-Randall
by Wilkinson Fisher
Attorneys

UNITED STATES PATENT OFFICE.

CHARLES ADAMS-RANDALL, OF NEW YORK, N. Y., ASSIGNOR TO RANDALL TELEPHONE MANUFACTURING COMPANY, OF AUGUSTA, MAINE, A CORPORATION OF MAINE.

AUTOMATIC TELEPHONE CIRCUIT AND REPEATER.

1,015,768.  Specification of Letters Patent.  Patented Jan. 30, 1912.

Application filed March 13, 1911. Serial No. 614,187.

*To all whom it may concern:*

Be it known that I, CHARLES ADAMS-RANDALL, a citizen of the United States, residing at New York, in the county of New York and State of New York, have invented certain new and useful Improvements in Automatic Telephone Circuits and Repeaters; and I do hereby declare the following to be a full, clear, and exact description of the invention, such as will enable others skilled in the art to which it appertains to make and use the same.

This invention relates to automatic telephone circuits and repeaters, and has for its object to adapt the repeater to ordinary telephone exchange uses whereby toll lines now operating unsatisfactorily, can be rendered more efficient.

This application differs from my two copending applications filed on the 13th day of March, 1911, and on the 20th day of December, 1910, and respectively numbered 614,191 and 598,343 in that no controllers or relays are employed, and further, in this application, the main lines are inductively connected, as illustrated.

With these and other objects in view, the invention consists in the novel arrangement of parts more fully hereinafter disclosed and particularly pointed out in the claims.

Referring to the accompanying drawing forming a part of this specification in which the figure is a diagrammatic illustration of a system arranged in accordance with my invention—1 represents any suitable transmitter, 2 a local battery associated therewith, and 3 a primary of the usual induction coil 4. 5 represents the secondary of said induction coil which is connected at one end by the wire 6 to the hook lever 7 associated with the contact 8 connected by the wire 9 to the receiver 10 which in turn is connected by the wire 11 to one side of the condenser 12. The other side of said condenser is connected by the wire 13 to one end of the transformer coil 14, which coil is connected at its other end by the wire 15 to one side of the condenser 16 whose other side is connected by the wire 17 to one end of the coils of the repeater 18, while the other end of said coils are connected by the wire 19 to the other end of the secondary 5, as shown.

The transformer coil 14 is inductively associated with a companion coil 20 connected at one end by the wire 21 to one side of the condenser 22, the other side of which is connected by the wire 23 to the receiver 24, which is connected by the wire 25 to the contact 26 associated with the hook lever 27, connected by the wire 28 to one end of the secondary 29 of the induction coil 30, the other end of which is connected by the wire 31 to one end of the coils of the repeater 32 while the other end of said coils is connected by the wire 33 to one side of the condenser 34. The other end of said condenser is connected by the wire 35 to the other end of the transformer coil 20, as illustrated.

Joined to the wire 13 at the point 36 is a wire 37 attached to the switch 38, which makes circuit with the wire 39 joined to the contact member 40 of the repeater 18, and associated with this contact member is a companion member 41 joined by the wire 42, to the local battery 43, joined by the wire 44, to the impedance 45, joined by the wire 46 to the wire 15, as shown. Likewise, connected to the wire 21 at the point 50 is the wire 51 joined to the switch 52 making circuit with the wire 53, connected with the contact member 54 of the repeater 32, which is associated with the member 55 joined by the wire 56 to the local battery 57 connected by the wire 58 to the impedance 59, which in turn is joined by the wire 60 to the wire 35, as shown.

The operation of my invention is as follows:—A subscriber at the station A calls a subscriber at the distant station B by any suitable calling apparatus (not shown) whereupon each subscriber removes the receivers from their respective hooks, and make the circuits at the contacts 7 and 8 and 26 and 27 respectively. After these contacts are made, speech being uttered into the transmitter 1, will cause currents in the well known manner to leave one end of the secondary coil 5 and to traverse the connection 6, contacts 7 and 8, connection 9, receiver 10, connection 11, and to flow into the condenser 12. Currents similar to these voice caused currents will flow out of the condenser 12 along the wire 13 through the coil 14, along the wire 15, into the condenser 16. Similar currents will flow out of the condenser 16, along the wire 17 through the coils of the repeater 18 and along the wire 19 back to the other end of the secondary 5. The currents flowing through the coil 14 will induce similar currents in coil 20, which currents may be supposed to leave said coil at one end along the wire 21 and to flow into the condenser 22. Similar currents will thereupon flow out of said condenser 22, along the wire 23, through the receiver 24, along the wire 25, across the contacts 26 and 27, along the wire 28, through the secondary 29, along the wire 31, through the coils of the repeater 32, along the wire 33, and into the condenser 34. Currents similar to these voice caused currents will thereupon flow out of said condenser 34 along the wire 35, back to the other end of said coil 20, whereupon the original speech will be reproduced in the receiver 24 at the distant station. The currents from the condenser 16, however, flowing through the coils of the repeater 18 will cause said repeater to vary the resistance across the contacts 40 and 41, whereupon currents similar to the original voice caused currents will flow from the battery 43 through the coil 14, and reinforce the original voice caused currents traversing said coil. This effect, of course, will cause the currents transmitted to the coil 20 to be reinforced and therefore the speech in the receiver 24 will be rendered clearer than would otherwise be the case.

When it is desired to talk from the station B to the station A, speech uttered into the transmitter 60 will cause currents in accordance with sound waves to leave the secondary 29 and over the connections shown, traverse the coils of the repeater 32, pass through the condenser 34, the coil 20, the condenser 22, the receiver 24, the contacts 26 and 27, and return to said secondary 29. These currents similar to sound waves traversing the coil 20 will induce similar currents in the coil 14, and these currents will traverse the condenser 12, the receiver 10, the contacts 8 and 7, the secondary 5, the coils of the repeater 18, and the condenser 16, so that the said speech will be heard in the receiver 10. In the same way, these voice caused currents from the station B passing through the coils of the repeater 32 will vary the resistance between the contacts 54 and 55 and thereupon cause currents from the battery 57 to reinforce the original currents traversing the coil 20. The effect of these latter currents will likewise reinforce the currents traversing the receiver 10, and therefore render the speech in said receiver clearer than would otherwise be the case.

The object of the condensers 12, 16 and 22, 34 in their respective line circuits, is to form a local shunt circuit of comparatively low resistance around the coils 14 and 20, to prevent the current from the batteries 43 and 57 traversing their respective line circuits.

The coils 45 and 59 are of low resistance to the battery currents and of high impedance to the alternating telephone currents in order to prevent the latter from traversing the local shunt circuits so that their full energy may be available on the main line circuits.

In some cases I find excellent results can be obtained by omitting one or both of the impedances 45 and 59, and in order to accomplish this I have provided the switches 70 and 71, and the shunts 72 and 73 around said impedances.

It is obvious that those skilled in the art may vary the arrangement of parts and the details of construction without departing from the spirit of my invention, and therefore I do not wish to be limited to the disclosures above, except as may be required by the claims.

What I claim is:—

1. In a telephone system, the combination of a main line; a pair of condensers in series with said line; a transformer coil in series with said line; a repeater coil in series with said line; a second main line; a repeating circuit joined in shunt to said first named line between said condensers; and a second transformer coil inductively associated with said first mentioned coil and in series with said second main line, substantially as described.

2. In a telephone system, the combination of a main line; a pair of condensers in series with said line; a transformer coil in series with said line between said condensers; a repeater coil in series with said line; a second main line; a repeating circuit provided with an impedance joined in shunt to said first named line between said condensers; and a second transformer coil inductively associated with said first mentioned coil and in series with said second main line, substantially as described.

3. In a telephone system, the combination of a plurality of main lines inductively associated; a repeater in series with each of said lines; a condenser in series with each of said lines; and a repeating circuit joined in shunt with each of said lines; substantially as described.

4. In a telephone system, the combination of a plurality of main lines inductively associated; a repeater in series with each of said lines; a pair of condensers in series with each of said lines; and a repeating circuit joined in shunt between said condensers with each of said lines, substantially as described.

5. In a telephone system, the combination of a plurality of main lines inductively associated; a repeater in series with each of said lines; a pair of condensers in series with each of said lines; and a repeating circuit having an impedance joined in shunt with each of said lines, substantially as described.

In testimony whereof, I affix my signature, in presence of two witnesses.

CHARLES ADAMS-RANDALL.

Witnesses:
I. W. SMITH,
FREDERICK B. BLACKMAN.

Copies of this patent may be obtained for five cents each, by addressing the "Commissioner of Patents, Washington, D. C."